United States Patent [19]

Bakal et al.

[11] Patent Number: 4,479,969

[45] Date of Patent: Oct. 30, 1984

[54] USE OF LACTOSE-HYDROLYZED WHEY IN CHEWING GUM

[75] Inventors: Abraham I. Bakal, Parsippany, N.J.; Tommy L. Crossman, Corning, N.Y.

[73] Assignee: Corning Glass Works, Corning, N.Y.

[21] Appl. No.: 472,734

[22] Filed: Mar. 7, 1983

[51] Int. Cl.$^3$ .............................................. A23G 3/30
[52] U.S. Cl. ........................................ 426/3; 426/583
[58] Field of Search ...................... 426/3, 4, 5, 6, 583

[56] References Cited

U.S. PATENT DOCUMENTS

| | | | |
|---|---|---|---|
| 2,197,719 | 4/1940 | Conner | 99/135 |
| 2,469,861 | 5/1949 | Cohoe | 426/3 |
| 2,586,675 | 2/1952 | Lutz | 426/3 |
| 2,681,858 | 6/1954 | Stimpson | 426/583 |
| 3,052,552 | 9/1962 | Koerner et al. | 99/148 |
| 3,814,815 | 6/1974 | Hashimoto et al. | 426/3 |
| 4,087,557 | 5/1978 | Bakal et al. | 426/3 |
| 4,157,401 | 6/1969 | Stroz et al. | 426/3 |
| 4,241,090 | 12/1980 | Stroz et al. | 426/4 |
| 4,241,091 | 6/1980 | Stroz et al. | 426/4 |
| 4,248,894 | 2/1981 | Mackay et al. | 426/3 |
| 4,248,895 | 9/1981 | Stroz et al. | 426/3 |

OTHER PUBLICATIONS

Weetall, H. H., Havewala, N. B., Pitcher, W. H., Jr., Datar, C. C., Vann, W. P. and Yaverbaum, S., *Biotechnology and Bioengineering*, vol. XVI, pp. 295-313 and 689-696 (1974).

Wierzbicki, L. E., Edwards, V. H., and Kosikowski, F. V., *Biotechnology and Bioengineering*, vol. XVI, pp. 397-411 (1974).

*Primary Examiner*—Jeanette M. Hunter
*Attorney, Agent, or Firm*—B. D. Voyce; W. E. Maycock

[57] ABSTRACT

Lactose-hydrolyzed whey or whey fractions are used in chewing gum to replace all or a part of the soluble sweetner, emulsifier and plasticizer components of conventional chewing gum formulations. The use of these materials allows the production of softer chewing gums which are not sticky and of athletic chewing gums which promote salivation. The use of the disclosed whey-based materials results in lower costs for chewing gum products, as well as providing a means to utilize the abundant food value of whey.

18 Claims, No Drawings

USE OF LACTOSE-HYDROLYZED WHEY IN CHEWING GUM

BACKGROUND OF THE INVENTION

1. Field of the Invention

This invention relates to chewing gums and in particular to the use of lactose-hydrolyzed whey or whey fractions in such products.

2. Description of the Prior Art

As is well known in the art, chewing gums generally include: (1) a gum base component composed of, for example, an ester gum, polyvinyl acetate, latex solids, natural and/or synthetic rubbers, waxes, texturizers and bulking agents; (2) a water soluble sweetener component composed of natural sugars such as sucrose and dextrose, and/or artificial sweeteners such as sodium or calcium saccharin, cyclamates, dihydrochalcones, glycyrrhizin, and glycyrrhizinates; (3) an emulsifier component, e.g., lecithin; (4) a plasticizer component, such as corn syrup; and (5) a flavoring component.

Over the years, various attempts have been made to replace one or more of the components of chewing gum with less expensive or more functionally effective materials. For example, attempts have been made to incorporate proteins and monosaccharides as replacements for the water soluble sweetener component. Also, monosaccharide syrups, such as glucose syrups, have been tried as replacements for the plasticizer. Unfortunately, gums including ingredients such as these turned out to be relatively too soft and tended to disintegrate in the user's mouth. Also, such gums were generally sticky and hygroscopic.

In recent years, specialized chewing gum products, including "soft" chewing gums and "athletic" chewing gums, have become popular. Soft gums typically include more water than conventional chewing gums. This has tended to make these gums sticky. Athletic chewing gums are designed to promote salivation. In general, this result has been achieved through the addition of such ingredients as potassium and sodium salts and acids to the chewing gum formulation.

This invention is directed to a new, highly functional, inexpensive material for use in chewing gum comprising lactose-hydrolyzed whey or lactose-hydrolyzed whey fractions. As discussed in detail below, it has been found, quite surprisingly, that such materials can be used to replace all or a part of the soluble sweetener, emulsifier and/or plasticizer components of chewing gum. These materials also provide a means for softening chewing gum without increasing its tackiness. Further, certain of the whey-based materials automatically lead to greater salivation by the user without the need to incorporate additional ingredients in the gum formulation.

Whole whey typically contains, per liter, approximately 6 to 9 grams of protein, 45 to 50 grams of lactose, 6 to 8 grams of mineral salts, and 1 to 2 grams of fat. On a world-wide basis, the production of whey each year is estimated to be over 50 billion pounds. Whey thus represents a potentially important natural source of food for human consumption, provided it can be modified from its original state so as to make it palatable and functional in combination with other food ingredients.

Unfortunately, whey, as it is produced during the cheese manufacturing process, is of limited value for use in commercial food products. Indeed, in the past, whey was regarded as a waste product and was discharged into sewers or streams and rivers. Today, however, because of increasing concerns over environmental pollution, much of the whey which is produced is subjected to some processing so that at a minimum it can be used as animal feed. Using whey as an animal feed, however, is a low value application and does not effectively take advantage of the true food value of whey.

Accordingly, the present invention provides a practical means to use the food value of whey, and at the same time, in view of the low cost of whey, to reduce the cost of chewing gum products.

SUMMARY OF THE INVENTION

It is an object of this invention to overcome the problems in the prior art relating to the use of less expensive ingredients in chewing gum formulations. It is also an object of the invention to provide a means for utilizing the food value of whey in commercial products.

It is another object of the invention to provide a soft chewing gum which is less tacky than prior art soft chewing gums. It is a further object of the invention to provide an athletic chewing gum which promotes salivation by the user.

In accordance with the invention, it has been found that when the lactose component of whey or a whey fraction has been hydrolyzed, the resulting product is especially useful in chewing gum products. In particular, it has been found that lactose-hydrolyzed whey or a lactose-hydrolyzed whey fraction can be successfully used to replace all or a part of the soluble sweetener, emulsifier and plasticizer components of conventional chewing gums. Moreover, it has been found that when lactose-hydrolyzed whey or whey fractions are used in chewing gum formulations, the resulting products have a soft texture, but are not sticky. It has been further found that when lactose-hydrolyzed whey or whey fractions are used which have not been demineralized, the resulting chewing gum promotes salivation and thus is suitable for use as an athletic chewing gum. In view of the low cost of whey, these uses for whey in chewing gum formulations represent an effective way to reduce the cost of chewing gum and, at the same time, utilize the food value in whey.

In accordance with one aspect of the invention, a chewing gum is provided which comprises:
  (a) a gum base component;
  (b) from about 0.5 to about 60 percent by weight of lactose-hydrolyzed whey or a lactose-hydrolyzed whey fraction which has a protein content of from about 2 to about 90 percent on a dry weight basis and which had, before hydrolysis, a lactose content of from about 5 to about 85 percent on a dry weight basis, which lactose is at least about 30 percent hydrolyzed; and
  (c) a soluble sweetener component, an emulsifier component, a plasticizer component and a flavoring component, as required.

In accordance with another aspect of the invention, a soft chewing gum is provided which comprises:
  (a) a gum base component;
  (b) from about 0.5 to about 20 percent by weight of a syrup composed of lactose-hydrolyzed whey or a lactose-hydrolyzed whey fraction, which syrup has a protein content of from about 2 to about 90 percent on a dry weight basis and which had, before hydrolysis, a lactose content of from about 5 to about 85 percent on a dry weight basis, which lactose is at least about 30 percent hydrolyzed; and (c) a soluble sweetener component, an emulsifier component, a plasticizer component and a flavoring component, as required.

In accordance with a further aspect of the invention, an athletic chewing gum is provided which comprises:

(a) a gum base component;

(b) from about 0.5 to about 60 percent by weight of lactose-hydrolyzed whey or a lactose-hydrolyzed whey fraction which has a protein content of from about 2 to about 90 percent on a dry weight basis, a mineral content of from about 2 to about 8 percent on a dry weight basis, and which had, before hydrolysis, a lactose content of from about 5 to about 85 percent on a dry weight basis, which lactose is at least about 30 percent hydrolyzed; and (c) a soluble sweetener component, an emulsifier component, a plasticizer component and a flavoring component, as required.

In accordance with an additional aspect of the invention, a method for softening chewing gum is provided which comprises admixing, with a mixture suitable for making chewing gum, a plasticizer comprising lactose-hydrolyzed whey or a lactose-hydrolyzed whey fraction which has a protein content of from about 2 to about 90 percent on a dry weight basis and which had, before hydrolysis, a lactose content of from about 5 to about 85 percent on a dry weight basis, which lactose is at least 30 percent hydrolyzed.

In accordance with another aspect of the invention, a method for producing a chewing gum which induces salivation is provided which comprises admixing, with a mixture suitable for making chewing gum, lactose-hydrolyzed whey or a lactose-hydrolyzed whey fraction which has a protein content of from about 2 to about 90 percent on a dry weight basis, a mineral content of from about 2 to about 8 percent on a dry weight basis, and which had, before hydrolysis, a lactose content of from about 5 to about 85 percent on a dry weight basis, which lactose is at least about 30 percent hydrolyzed.

In certain preferred embodiments, the protein content of the lactose-hydrolyzed whey or lactose-hydrolyzed whey fraction is from about 8 to about 60 percent on a dry weight basis, the lactose content, before hydrolysis, was from about 20 to about 85 percent on a dry weight basis and the lactose is at least about 40 percent hydrolyzed.

In other preferred embodiments, the protein content of the lactose-hydrolyzed whey or lactose-hydrolyzed whey fraction is from about 8 to about 20 percent on a dry weight basis and the lactose content, before hydrolysis, was from about 60 to about 80 percent on a dry weight basis, which lactose is at least about 40 percent hydrolyzed.

As used herein and as generally understood in the art, the term "whey" means whey as obtained from a cheese manufacturing process, i.e., whole whey. The term "whey fraction" applies to whey which has had one or more constitutents either wholly or partially removed. Examples of the more common whey fractions include, by way of illustration only, whey permeate, which is whey from which a substantial amount of protein has been removed, typically by ultrafiltration; demineralized whey, which is whey from which part or all of the mineral (inorganic) salts have been removed; and whey protein concentrate, which is the protein-enriched fraction obtained by ultrafiltration (whey permeate, of course, is the other fraction).

In general, hydrolysis of the whey or whey fraction can be accomplished by any known means. Thus, hydrolysis can be carried out by chemical methods or enzymatic methods which, in the latter case, can utilize either soluble or immobilized enzymes. Enzymatic hydrolysis is preferred, and the use of immobilized enzymes is most preferred.

DESCRIPTION OF THE PREFERRED EMBODIMENTS

As discussed above, the present invention provides a new ingredient comprising lactose-hydrolyzed whey or a lactose-hydrolyzed whey fraction for chewing gum products.

The composition and methods of preparation of chewing gum products are well known to persons having ordinary skill in the art. By way of illustration only, specific recipes and methods of preparation for fruit and spearmint flavored products are described below. The ingredients, quantities and methods of preparation used in the examples are not critical and other recipes and procedures, readily apparent to those of ordinary skill in the art, can be used for these products and for other chewing gum products.

In general terms, chewing gums are made by mixing a gum base with other functional ingredients such as sugar (a soluble sweetener), corn syrup (a plasticizer), lecithin (an emulsifier) and flavorings. A typical chewing gum composition is approximately as follows:

Gum Base: 20–25%
Sugar: 55–65%
Corn Syrup: 15–20%
Lecithin: 0–0.8%
Flavor: 0.3–2.0%

The gum base is prepared by heating and blending various ingredients, such as natural gums, synthetic resins, waxes, plasticizers, etc., in a manner well known in the art. Typical examples of the ingredients found in a chewing gum base are masticatory substances of synthetic origin such as styrene-butadiene copolymers, isobutylene-isoprene copolymers, polyisobutylene polymers, polyethylene polymers, petroleum wax, polyvinyl acetate polymers, as well as masticatory substances of natural origin such as rubber latex solids, chicle, crown gum, nispero, rosidinha, jelutong, pendare, perillo, niger gutta, tunu, etc. The elastomer or masticatory substance will be employed in an amount within the range of about 5 to about 15 percent, preferably from about 8 to about 12 percent, and optimally from about 9 to about 11 percent by weight of the gum base composition.

In addition, the gum base will preferably contain a solvent for the elastomer which should have minimal tackifying properties and will preferably comprise hydrogenated ester gum, that is, glycerol ester of hydrogenated rosin and/or dimerized ester gum.

Other conventional ingredients which may be present in the gum base include a hydrophilic-type detackifier which will sorb saliva and become slippery and is incompatible with the elastomer and solvent for the elastomer, such as polyvinyl acetate, polyvinyl butyl ether, copolymers of vinyl esters and vinyl ethers.

The gum base may also include hard waxes which serve as lubricants and should have a melting point of above about 65° C. and preferably above about 75° C. Examples of such hard waxes include candelilla wax, paraffin wax, carnauba wax, ozokerite, oricury, microcrystalline wax, and the like.

The gum base may also include a softening agent and lubricant combination which may comprise one or more hydrogenated vegetable or animal fats having a high melting point, that is above about 22° C.

The gum base will also include an emulsifier to impart hydrophilic properties to the gum base so that saliva will be absorbed, thereby making the gum base slippery. Examples of such emulsifiers include glyceryl monostearate, phosphatides, such as lecithin and cephalin, Tweens, Spans and mixtures thereof.

In addition, the gum base may include colorants such as titanium dioxide, plasticizers, such as lanolin, stearic acid, sodium stearate, potassium stearate and the like, antioxidants, in an amount up to about 1000 ppm of the gum base, such as butylated hydroxytoluene, butylated hydroxyanisole, and/or propyl gallate.

The gum base may in addition include bulking agents in amounts ranging from about 10 to about 100% by weight, and preferably from about 10 to about 50% by weight of the gum base portion. Examples of bulking agents suitable for use in the gum base include, but are not limited to, calcium barbonate, aluminum hydroxide, alumina, magnesium carbonate, talc ($3MgO.4SiO_2.H_2O$), aluminum silicates, Cab-O-Sil, chalk, and combinations thereof. When chalk is used as a bulking agent, the normally acidic lactose-hydrolyzed whey or lactose-hydrolyzed whey fraction is neutralized by an alkali such as sodium hydroxide. Examples of typical gum bases suitable for use herein are disclosed in U.S. Pat. Nos. 2,197,719 and 3,052,552.

The gum base will be present in the finished chewing gum product in an amount within the range of from about 10 to about 40 percent, and preferably from about 20 to about 25 percent by weight.

The flavoring component of the chewing gum is generally present in an amount within the range of from about 0.3 to about 2 percent, and preferably from about 0.5 to about 1.5 percent by weight. The flavoring component of the chewing gum may comprise oils derived from plants, leaves, flowers, fruit, etc. Representative flavor oils of this type include citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewing gum of the invention with or without conventional preservatives.

The chewing gum of the invention will optionally, and preferably, include a water-soluble sweetener component in addition to the lactose-hydrolyzed whey or lactose-hydrolyzed whey fraction, which itself functions as a soluble sweetener. Soluble sweeteners suitable for use herein may comprise natural sugar, natural sugar substitutes, synthetic sugar substitutes or combinations thereof.

Where employed, the synthetic sugar substitutes may be present in the chewing gum in an amount within the range of from about 0.04 to about 2 percent and preferably from about 0.4 to about 0.8 percent by weight of the chewing gum. Examples of synthetic sweeteners suitable for use herein include free saccharin acid, sodium, calcium or ammonium saccharin, cyclamate salts, dihydrochalcones, glycyrrhizic acid and salts, L-aspartyl-L-phenylalanine methyl ester and mixtures thereof.

Where employed, natural sugars and/or natural sugar substitutes may be present in an amount within the range of from about 0.05 to about 90 percent, and preferably from about 10 to about 85 percent by weight of the chewing gum. Natural sweeteners suitable for use herein include sugar alcohols, such as sorbitol, xylitol, mannitol, or maltitol, as well as monosaccharides of 5 or 6 carbon atoms, such as arabinose, xylose, ribose, glucose, mannose, galactose, fructose, dextrose, or sorbose or mixtures of two or more of the foregoing monosaccharides; disaccharides, such as sucrose, cane or beet sugar, lactose, maltose or cellobiose; and polysaccharides, such as partially hydrolyzed starch, dextrin or corn syrup solids.

The chewing gum of the invention also can include a plasticizer or aqueous softener, in addition to the lactose-hydrolyzed whey or lactose-hydrolyzed whey fraction, which itself serves as a plasticizer. Suitable plasticizers include polyhydric alcohols in liquid form (xylitol syrup, sorbitol syrup, maltitol syrup), modified starch syrup and corn syrup. Similarly, the chewing gum can include an emulsifier, such as lecithin, in addition to the lactose-hydrolyzed whey or lactose-hydrolyzed whey fraction, which itself functions as an emulsifier in the chewing gums of the present invention.

In accordance with the most preferred embodiment of the invention, the hydrolysis of the whey or whey fraction is performed by means of immobilized enzymes. Hydrolysis by this approach is well known to those having ordinary skill in the art. By way of illustration only, H. H. Weetall et al., *Biotechnol. Bioeng.*, 16, 295 (1974), reports the preparation of immobilized lactase and its use in the enzymatic hydrolysis of acid whey. The enzyme, isolated from both fungi and yeast, was immobilized on zirconia-coated porous glass particles. The substrate consisted of either an aqueous lactose solution or acid whey permeate.

Additionally, L. W. Wierzbicki et al., *Biotechnol. Bioeng.*, 16, 397 (1974), discusses the hydrolysis of lactose in acid whey using lactase immobilized on porous glass particles with emphasis on the preparation and characterization of a reusable catalyst for the production of lowlactose dairy products. Partially purified lactases from *Aspergillus niger*, *Lactobacillus helveticus*, and *Saccharomyces Lactis* were immobilized on porous glass particles. The substrate consisted of acid whey powder which had been reconstituted in water to the appropriate solids concentration. In some instances, the reconstituted acid whey was deproteinized by heating in a boiling water bath for five minutes.

Moreover, H. H. Weetall et al., *Biotechnol. Bioeng.*, 16, 689 (1974), describes the preparation of immobilized lactase as part of continued studies on the enzymatic hydrolysis of lactose. A fungal lactase was employed, immobilized on zirconia-coated controlled-pore glass and porous titania particles. The resulting immobilized enzyme preparations were used for the hydrolysis of lactose in whole sweet whey, whole acid whey, acid whey ultrafiltrate (permeate), and pure lactose.

An especially useful process for hydrolyzing lactose is disclosed in copending and commonly assigned application Ser. No. 269,945 filed July 3, 1981 in the names of Jean-Luc A. Guy Baret and Luc A. Dohan. The process involves heating the whey to a temperature of from about 45° C. to about 90° C. for at least about 15 seconds, centrifuging the heated whey while it is still warm, and contacting the centrifuged whey with an immobilized lactase under conditions sufficient to hydrolyze at least a portion of the lactose contained therein into glucose and galactose.

With regard to the composition of the lactose-hydrolyzed whey or whey fraction, its protein content is generally between from about 2 to about 90 percent on a dry weight basis and its lactose content, before hydrolysis, was generally from about 5 to about 85 percent on a dry weight basis, which lactose is at least about 30 percent hydrolyzed. The protein content preferably is from about 8 to about 60 percent on a dry weight basis, with from about 8 to about 20 percent on a dry weight basis being more preferred.

Preferably, the lactose content, before hydrolysis, of the whey or whey fraction was from about 20 to about 85 percent on a dry weight basis. More preferably, the lactose content before hydrolysis was from about 60 to about 80 percent on a dry weight basis. The lactose preferably is at least about 40 percent hydrolyzed and more preferably, at least about 70 percent hydrolyzed.

In an especially preferred embodiment, the protein content of the lactose-hydrolyzed whey or whey fraction is from about 8 to about 60 percent on a dry weight basis and the lactose content, before hydrolysis, was from about 20 to about 85 percent on a dry weight basis, which lactose is at least about 40 percent hydrolyzed. Most preferably, such lactose is at least about 70 percent hydrolyzed.

In another especially preferred embodiment, the protein content of the lactose-hydrolyzed whey or whey fraction is from about 8 to about 20 percent on a dry weight basis and the lactose content, before hydrolysis, was from about 60 to about 80 percent on a dry weight basis, which lactose is at least about 40 percent hydrolyzed, and most preferably at least about 70 percent hydrolyzed.

Without intending to limit it in any manner, the present invention will be more fully described by the following examples which compare chewing gums made with lactose-hydrolyzed whey or whey fractions with chewing gums made with conventional ingredients and which illustrate certain preferred embodiments of the invention. In particular, Examples 1-4 compare conventional gums and gums having 50% of the plasticizer component (corn syrup) and all of the emulsifier component (lecithin) replaced with either (1) lactose-hydrolyzed whole whey syrup (Example 1); (2) fifty percent demineralized lactose-hydrolyzed whole whey syrup (Example 2); (3) a one-to-one mixture of demineralized and non-demineralized lactose-hydrolyzed whole whey syrup; or (4) lactose-hydrolyzed whey permeate (Example 4). In another series of tests, gums were prepared having 25 percent of the soluble sweetener component (sugar) replaced with lactose-hydrolyzed whole whey powder (Example 5).

The conventional and test products of each series were compared by a seven member expert taste panel for flavor and overall chew quality. The products of Examples 1 to 4 were further evaluated for softness, and the products of Examples 3 to 5 were further evaluated for juiciness, i.e., their salivation effects. The gums were rated after three minutes of chewing using the scoring system shown in Table 1:

TABLE I

| Score | Flavor | Overall Chew Quality | Softness | Juiciness |
|---|---|---|---|---|
| 0 | None | Extremely Dislike | Very Soft | None |
| 2 | Perceptible | Dislike Moderately | Soft | Perceptible |
| 4 | Definite | Neither Like Nor Dislike | Neither Soft Nor Hard | Definite |
| 6 | Strong | Like Moderately | Hard | Juicy |
| 8 | Very Strong | Like Extremely | Very Hard | Very Juicy |

As discussed in detail below, the gums including lactose-hydrolyzed whey or a lactose-hydrolyzed whey fraction were each found to perform as well as the conventional gum formulations with regard to flavor and overall chew quality. Moreover, the test gums of Examples 1-4 were each found to be significantly softer than the conventional gums without being sticky, and the test gums of examples 3-5 were found to be juicier.

The lactose-hydrolyzed whey products used in the various examples were supplied by Corning BIOsystems, Corning Glass Works, Corning, New York. In each case, approximately 88-92% of the lactose originally in the whey was hydrolyzed.

The composition of the lactose-hydrolyzed whole whey syrup used in Examples 1 and 3 was typically:

| Ingredient | Weight Percent |
|---|---|
| Protein | 6.5-8.0% |
| Lactose | 3-5% |
| Glucose | 16-21% |
| Galactose | 16-21% |
| Ash | 4-6% |
| Fat | 0.5-1% |
| Moisture | 35-40% |

The composition of the lactose-hydrolyzed whey permeate used in Example 4 was typically:

| Ingredient | Weight Percent |
|---|---|
| Protein | 0.01-0.05% |
| Lactose | 10-12% |
| Glucose | 20-22% |
| Galactose | 20-22% |
| Ash | 10-12% |
| Fat | 0.1-0.3% |
| Moisture | 31-39% |

The composition of the lactose-hydrolyzed whole whey powder used in Example 5 was typically:

| Ingredient | Weight Percent |
|---|---|
| Protein | 11-13% |
| Lactose | 3-5% |
| Glucose | 27-32% |
| Galactose | 27-32% |
| Ash | 7-10% |
| Fat | <1% |
| Moisture | 2-5% |

The fifty percent demineralized lactose-hydrolyzed whole whey syrup used in Examples 2 and 3 was obtained from the lactose-hydrolyzed whole whey syrup described above by passing that syrup, after lactose-hydrolysis, through an ion-exchange column. Demineralization can also be done by electrodialysis. The demineralized syrup had essentially the composition as that give above for the non-demineralized product except that the ash content was between 1.25 and 2.0%.

EXAMPLE 1

To demonstrate the ability of lactose-hydrolyzed whole whey to replace all of the emulsifier component of a chewing gum and part of the plasticizer component, two fruit flavored chewing gums were prepared. The composition of these gums were as follows, where the percentages given are by weight:

|  | Conventional Formulation | Lactose-Hydrolyzed Whole Whey Syrup |
|---|---|---|
| Gum Base (Talc Type) | 21.0% | 21.0% |
| Corn Syrup | 17.0% | 8.5% |
| Sugar | 61.0% | 61.2% |
| Lecithin | 0.2% | — |
| Flavor | 0.8% | 0.8% |
| Lactose-Hydrolyzed Whole Whey Syrup | — | 8.5% |

Each gum was prepared by first melting the gum base in a jacketed sigma blade mixer. The gum base was cooled to 180° F. and the lecithin, where used, was added. Then the corn syrup or the combination of corn syrup and lactose-hydrolyzed whole whey syrup were added and mixed thoroughly. The flavor was then added and mixed in, and finally the sugar was added and mixed in. The chewing gum thus obtained was rolled and scored.

The conventional and test gums were tested by the expert taste panel as described above. The data obtained was as follows:

|  | Flavor | Softness | Overall Chew Quality |
|---|---|---|---|
| Conventional | 4.6 | 5.0* | 4.4 |
| Lactose-Hydrolyzed Whole Whey Syrup | 4.8 | 3.4 | 4.6 |

*Significantly harder at the 95 percent confidence level.

Analysis of this data indicated that there was no significant difference at the 95% confidence level between the conventional gum formulation and the formulation using lactose-hydrolyzed whole whey syrup with regard to either flavor or overall chew quality. Moreover, it was found that the gum made with lactose-hydrolyzed whole whey syrup was significantly (at the 95% confidence level) softer than the conventional gum. Further, the gum made with lactose-hydrolyzed whole whey syrup, although softer, was not sticky. These are important results in view of the growing importance of soft chewing gum in the chewing gum market.

EXAMPLE 2

Two chewing gums were made in accordance with Example 1, except that fifty percent demineralized lactose-hydrolyzed whole whey syrup, described above, was used instead of non-demineralized syrup. Also, spearmint flavors instead of fruit flavors were used, the demineralized product being less salty than the non-demineralized product.

The products were subjected to taste panel evaluation and the average scores obtained after 3 minutes of chewing were as follows:

|  | Flavor | Softness | Overall Chew Quality |
|---|---|---|---|
| Conventional | 4.8 | 4.8* | 4.6 |
| 50% demineralized, lactose-hydrolyzed, whole whey syrup | 5.2 | 3.0 | 4.6 |

*Significantly harder at the 95 percent confidence level.

The data clearly indicate that the panel judged both products as equal in flavor and overall quality. Further, the panel rated the gum containing the hydrolyzed demineralized whey syrup as significantly (at the 95% confidence level) softer than the conventional gum.

EXAMPLE 3

A conventional fruit flavored chewing gum was prepared as described in Example 1. An experimental gum was also prepared in accordance with Example 1, but with a one-to-one mixture of lactose-hydrolyzed whole whey syrup and 50% demineralized lactose-hydrolyzed whole whey syrup in place of the lactose-hydrolyzed whole whey syrup in the formulation given in Example 1.

The gums were evaluated by the taste panel after 3 minutes of chewing for flavor, softness, juiciness, and overall quality. The results were as follows:

|  | Flavor | Softness | Juiciness | Overall Quality |
|---|---|---|---|---|
| Conventional Gum | 4.6 | 4.8* | 3.2* | 4.8 |
| Experimental Gum | 4.8 | 3.2 | 6.0 | 5.0 |

*Significantly different at the 95 percent confidence level.

These data clearly indicate that the experimental gum was judged as significantly (at the 95% confidence level) juicier and softer than the conventional gum.

EXAMPLE 4

Conventional fruit flavored chewing gum was prepared in accordance with the formulation and method described in Example 1. Experimental chewing gum was prepared in accordance with Example 1, but with the lactose-hydrolyzed whey replaced with the lactose-hydrolyzed permeate described above.

The gums were evaluated after 3 minutes of chewing by the taste panel for juiciness, softness, flavor and overall chewing quality. The results were as follows:

|  | Flavor | Softness | Juiciness | Overall Quality |
|---|---|---|---|---|
| Conventional Gum | 4.6 | 5.7* | 3.2* | 4.4 |
| Experimental Gum | 4.8 | 3.2 | 6.0 | 4.6 |

*Significantly different at the 95 percent confidence level.

The data clearly indicated that the panel judged the experimental gum containing the permeate fraction as significantly juicier and softer than the conventional gum.

EXAMPLE 5

To demonstrate the use of lactose-hydrolyzed whole whey powder as a replacement for a portion of the soluble sweetener component of a chewing gum, two fruit flavored gums were prepared having the following compositions:

|  | Conventional Formulation | Lactose-Hydrolyzed Whole Whey Powder |
|---|---|---|
| Gum Base (Talc Type) | 21.0% | 21.0% |
| Corn Syrup | 17.0% | 17.0% |
| Sugar | 61.0% | 45.7% |
| Lecithin | 0.2% | 0.2% |
| Flavor | 0.8% | 0.8% |
| Lactose-Hydrolyzed Whole Whey Powder | — | 15.3% |

These gums were prepared in the same manner as the gums of Example 1. They were tested by the expert taste panel for flavor, overall chew quality and juiciness using the hedonic scale described above. The data obtained from the expert taste panel was as follows:

|  | Flavor | Juiciness | Overall Chew Quality |
|---|---|---|---|
| Conventional | 5.2 | 3.0 | 4.6 |
| Lactose-Hydrolyzed Whole Whey Powder | 5.0 | 5.8* | 4.2 |

*Significantly different at the 95 percent confidence level.

Analysis of this data indicated that again there were no significant differences between the product including lactose-hydrolyzed whey and the conventional chewing gum formulation with regard to flavor and overall chew quality at the 95% confidence level. With regard to juiciness, the product made with lactose-hydrolyzed whole whey powder was judged as significantly (at the 95% confidence level) juicier than the chewing gum having a conventional formulation. Accordingly, this product can be used as an athletic gum.

It is to be understood that the foregoing detailed description is given merely by way of illustration and that many variations thereof may be made without departing from the spirit or scope of the invention. For example, the definitions of lactose-hydrolyzed whey and lactose-hydrolyzed whey fractions are deemed to cover reconstituted lactose-hydrolyzed whey products and reconstituted lactose-hydrolyzed whey fractions. Additionally, such definitions include synthetic lactose-hydrolyzed whey and synthetic lactose-hydrolyzed whey fractions, i.e., any composition obtained by combining whey or other protein with appropriate amounts of lactose and/or glucose and galactose whereby such composition meets the requirements of the whey-based ingredients for chewing gum as defined herein. Other variations will be apparent to one having ordinary skill in the art.

What is claimed is:

1. A chewing gum which comprises:
   (a) a gum base component;
   (b) a sweetening, plasticizing, and emulsifying component comprising from about 0.5 to about 60 percent by weight of a whey or a whey fraction which has a protein content of from about 2 to about 90 percent on a dry weight basis, and which has been lactose hydrolysed such that at least about 30 percent of the lactose, content of from about 5 to about 85 percent on a dry weight basis, has been hydrolyzed; and
   (c) a soluble sweetener component, and a flavoring component, as required.

2. The chewing gum of claim 1 in which at least about 40 percent of the lactose content has been hydrolyzed.

3. The chewing gum of claim 1 in which at least about 70 percent of the lactose content has been hydrolyzed.

4. The chewing gum of claim 1 in which the protein content of the lactose-hydrolyzed whey or lactose-hydrolyzed whey fraction is from about 8 to about 60 percent by weight.

5. The chewing gum of claim 1 in which the protein content of the lactose-hydrolyzed whey or lactose-hydrolyzed whey fraction is from about 8 to about 20 percent by weight.

6. The chewing gum of claim 1 in which the whey or whey fraction has a lactose content of from about 20 to about 85 percent by weight before hydrolysis.

7. The chewing gum of claim 6 in which at least about 40 percent of the lactose content has been hydrolyzed.

8. The chewing gum of claim 6 in which at least about 70 percent of the lactose content has been hydrolyzed.

9. The chewing gum of claim 1 in which the whey or whey fraction has a lactose content of from about 60 to about 80 percent by weight before hydrolysis.

10. The chewing gum of claim 9 in which at least about 40 percent of the lactose content has been hydrolyzed.

11. The chewing gum of claim 9 in which at least about 70 percent of the lactose content has been hydrolyzed.

12. The chewing gum of claim 1 in which the whey fraction has a protein content of from about 8 to about 60 percent by weight and has a lactose content of from about 20 to about 85 percent by weight before hydrolysis, of which about 40 percent of the lactose is hydrolyzed.

13. The chewing gum of claim 12 in which at least about 70 percent of the lactose content has been hydrolyzed.

14. The chewing gum of claim 1 in which the whey or whey fraction has a protein content of from about 8 to about 20 percent by weight and has a lactose content of from about 60 to about 80 percent by weight before hydrolysis of which about 40 percent of the lactose is hydrolyzed.

15. The chewing gum of claim 14 in which at least about 70 percent of the lactose content has been hydrolyzed.

16. A soft chewing gum which comprises:
   (a) a gum base component;
   (b) a sweetening, plasticizing, and emulsifying component comprising from about 0.5 to about 20 percent by weight of a syrup composed of lactose-hydrolyzed whey or a lactose-hydrolyzed whey fraction, which syrup has a protein content of from about 2 to about 90 percent on a dry weight basis and has been lactose hydrolyzed such that at least about 30 percent of the lactose content of from about 5 to about 85 percent on a dry weight basis has been hydrolyzed; and
   (c) a soluble sweetener component, and a flavoring component, as required.

17. An athletic chewing gum which comprises:
   (a) a gum base component;
   (b) a sweetening, plasticizing, and emulsifying component comprising from about 0.5 to about 60 percent by weight of lactose-hydrolyzed whey or a lactose-hydrolyzed whey fraction which as a protein content of from about 2 to about 90 percent on a dry weight basis, a mineral content of from about 2 to about 8 percent on a dry weight basis, and which has been lactose hydrolyzed such that at least about 30 percent of the lactose content of from about 5 to 85 percent has been hydrolyzed; and (c) a soluble sweetener component, and a flavoring component, as required.

18. A method for softening chewing gum which comprises admixing, with a mixture suitable for making chewing gum, a plasticizer and emulsifier comprising lactose-hydrolyzed whey or a lactose-hydrolyzed whey fraction which has a protein content of from about 2 to about 90 percent on a dry weight basis and which has been lactose hydrolyzed such that at least 30 percent of the lactose content of from about 5 to 85 percent has been hydrolyzed.

* * * * *